(12) United States Patent
Miyamoto (10) Patent No.: US 7,696,651 B2
(45) Date of Patent: Apr. 13, 2010

(54) LINEAR MOTOR

(75) Inventor: Yasuhiro Miyamoto, Fukuoka (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 623 days.

(21) Appl. No.: 10/583,257

(22) PCT Filed: Nov. 26, 2004

(86) PCT No.: PCT/JP2004/017590

§ 371 (c)(1),
(2), (4) Date: May 24, 2007

(87) PCT Pub. No.: WO2005/060076

PCT Pub. Date: Jun. 30, 2005

(65) Prior Publication Data

US 2007/0247008 A1    Oct. 25, 2007

(30) Foreign Application Priority Data

Dec. 16, 2003    (JP) ............................. 2003-417665

(51) Int. Cl.
*H02K 41/00* (2006.01)
(52) U.S. Cl. ........................................ 310/12; 310/13
(58) Field of Classification Search .................. 310/12, 310/13, 14
See application file for complete search history.

(56) References Cited

U.S. PATENT DOCUMENTS

| | | | | |
|---|---|---|---|---|
| 4,439,698 A * | 3/1984 | Chen | ........................... | 310/12 |
| 4,758,750 A * | 7/1988 | Itagaki et al. | .................. | 310/13 |
| 6,140,734 A * | 10/2000 | Hazelton et al. | ............ | 310/198 |
| 6,160,327 A * | 12/2000 | Wang | ........................... | 310/12 |
| 6,281,610 B1 * | 8/2001 | Kliman et al. | ............... | 310/143 |
| 6,326,708 B1 * | 12/2001 | Tsuboi et al. | .................. | 310/12 |
| 6,608,407 B2 * | 8/2003 | Kawada | ......................... | 310/12 |
| 6,661,124 B1 * | 12/2003 | Seki et al. | ...................... | 310/12 |
| 6,789,305 B2 * | 9/2004 | Seki et al. | ...................... | 29/596 |
| 7,109,610 B2 * | 9/2006 | Tamai | ........................... | 310/12 |
| 7,442,022 B2 * | 10/2008 | Konno et al. | ................. | 425/150 |

FOREIGN PATENT DOCUMENTS

| | | | |
|---|---|---|---|
| JP | 8-196070 A | | 7/1996 |
| JP | 10-42496 A | | 2/1998 |
| JP | 10-323011 A | | 12/1998 |
| JP | 11-206100 A | | 7/1999 |

* cited by examiner

*Primary Examiner*—Thanh-Tam T Le
(74) *Attorney, Agent, or Firm*—Sughrue Mion, PLLC (57) ABSTRACT

A linear motor comprising a mover part including; an armature module having an I shaped magnetic iron core and an armature winding of one kind wound on the periphery of the I shaped magnetic iron core through an insulating material. A non-magnetic material holder on which a plurality of armature modules are arranged in a stroke direction is provided. A base upper plate and a base lower plate are provided for attaching the non-magnetic material holder in upper and lower parts respectively. A stator part includes a plurality of field permanent magnets opposed to the I shaped magnetic iron cores through magnetic spaces and field yokes for supporting the field permanent magnets. The non-magnetic material holder has at both end parts thereof through holes for inserting bolts corresponding to the forms and the arranging pitches of the I shaped magnetic iron cores.

10 Claims, 7 Drawing Sheets

LINEAR MOTOR

TECHNICAL FIELD

The present invention relates to a structure of an armature of a linear motor and an attraction force cancel type linear motor and more particularly to a fixation of a divided armature module.

RELATED ART

In a usual armature of a attraction force cancel type linear motor, the armature is divided into modules and the armature modules are respectively fixed to upper and lower parts of the base of the armature by bolts by using tapped holes provided in prisms arranged between armature module cores (for instance, see Patent Document 1).

Patent Document 1: JP-A-10-323011 (FIGS. 1 and 3)

Figure 6:
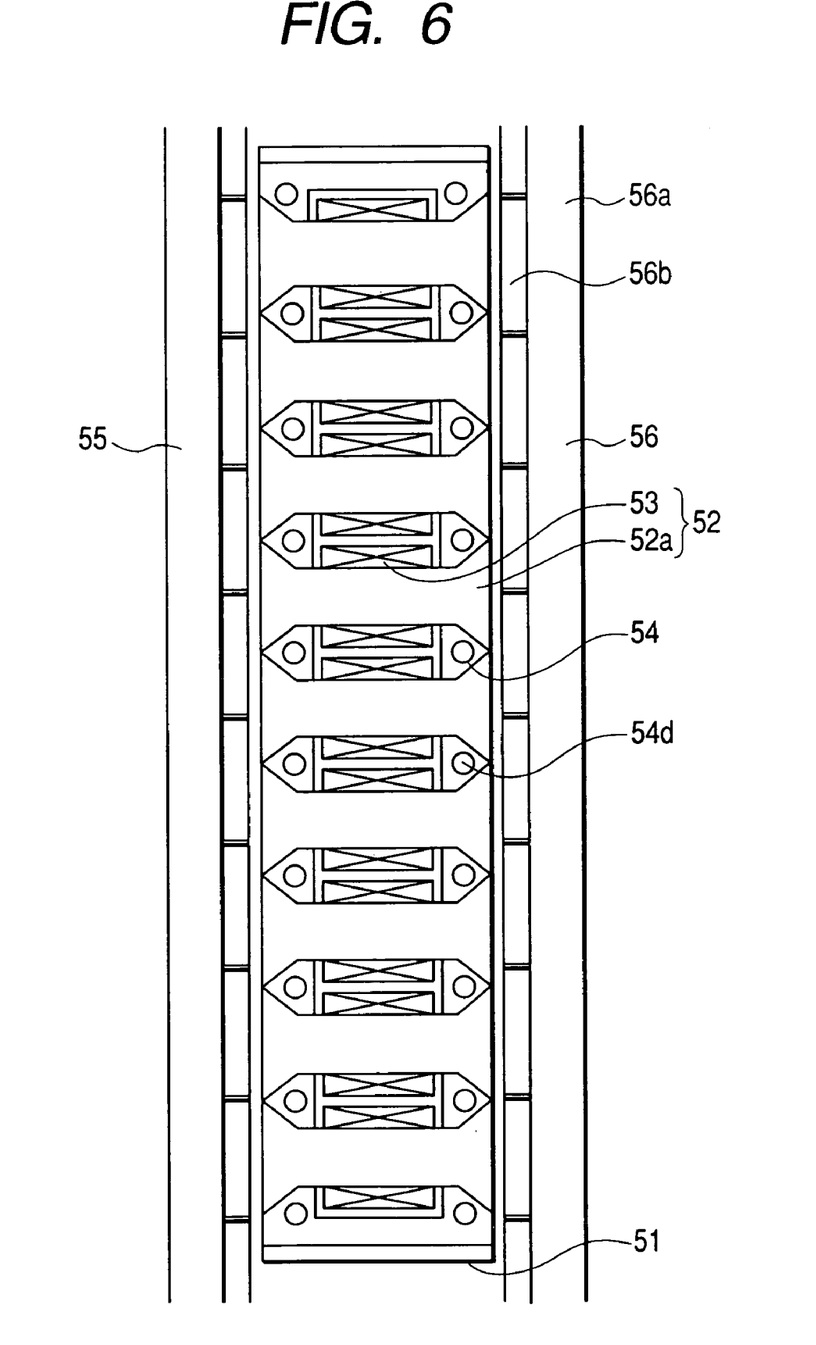
FIG. 6 is a view of a section taken in the longitudinal direction of a first usual example of a magnetic attraction force cancel type linear motor viewed from an upper part.

FIG. 6 is a view of a section taken in the longitudinal direction of the linear motor described in the Patent Document 1 viewed from an upper part. A stator includes two parts of a left side stator 55 and a right side stator 56. The stators having the same structures are arranged to be opposed to each other. The stators 55 and 56 are respectively formed with field permanent magnets 56b and field back yokes 56a to which the field permanent magnets 56b are attached. A mover 51 is located between the two stators 55 and 56. An upper surface thereof is fixed to a load and supported so as to be movable in the longitudinal direction (that is, upward and downward in the drawing). The structure of the mover 51 includes armature pieces 52 formed by winding armature windings 53 on I shaped armature teeth 52a, prisms 54 made of a non-magnetic material inserted between the ends of the teeth and a base for fixing the prisms 54. The outline of the prism 54 is formed along the figure of the end of the armature piece 52 and the prism 54 is bonded and fixed to the end of the armature piece 52. On the prisms 54, tapped holes 54d are formed on upper and lower surfaces of the prisms 54 and all the prisms 54 are attached to the base by bolts.

Figure 7:
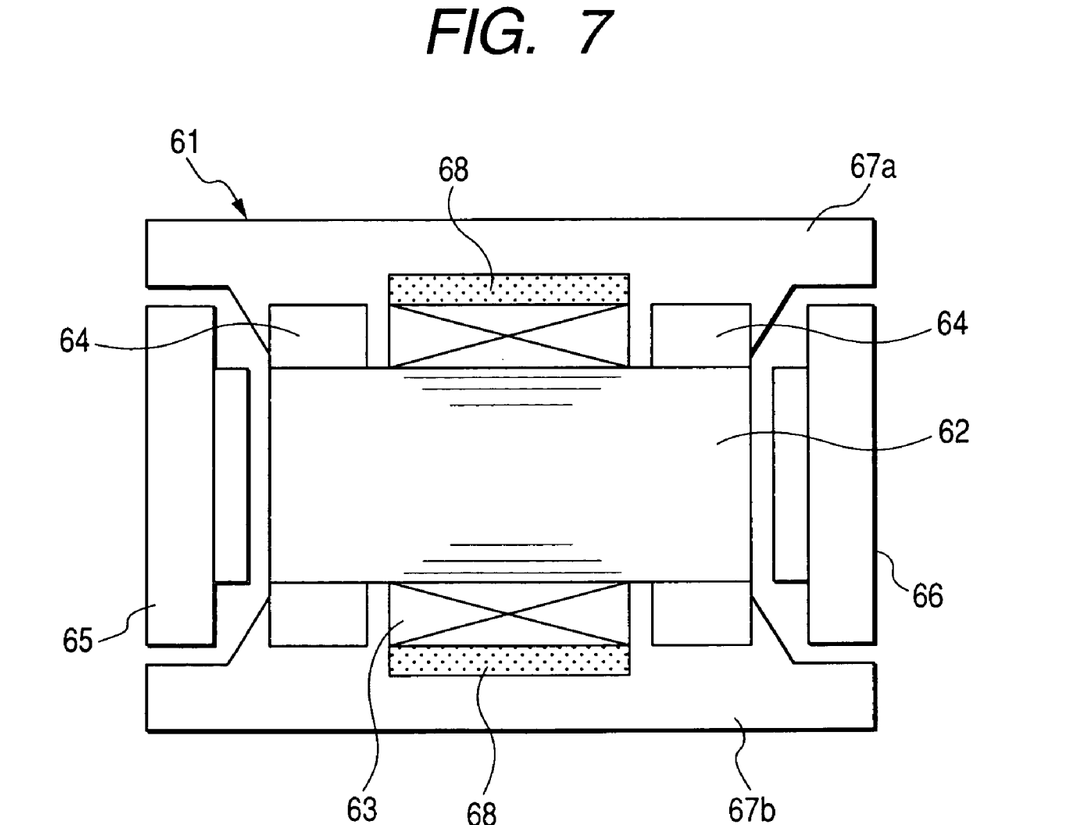
FIG. 7 is a front sectional view of a second usual example of a magnetic attraction force cancel type linear motor.

FIG. 7 is a similar front sectional view of another example of the linear motor described in the Patent Document 1.

In the drawing, 61 designates a mover, 62 designates an armature module part, 63 designates an armature winding, 64 designates a prism, 65 designates a left side stator, 66 designates a right side stator, 67 designates a base (67a designates an upper base and 67b designates a lower base) and 68 designates a jacket. In the structure of the mover 61, the upper base 67a and the lower base 67b are arranged and fixed on the upper and lower parts of the armature module part 62. A load can be fixed by using the upper surface of the lower base 67b and the lower surface of the upper base 67a. As described above, the upper base 67a and the lower base 67b are attached to the armature part from above and below to fix the armature part by fixing bolts 64c and bolts.

As described above, in the usual attraction force cancel type linear motor, the armature modules are respectively positioned and fixed by using the tapped holes formed in the fixing prisms arranged between the armature modules.

DISCLOSURE OF THE INVENTION

Problems to be Solved by the Invention

The usual attraction force cancel type linear motor has a structure that the tapped fixing prisms are arranged in spaces of parts where the windings are disposed between the armature modules at the sacrifice of the spaces. Accordingly, since the windings cannot be arranged in the parts of the fixing prisms, a problem arises that a loss is increased to lower the efficiency of the linear motor.

The present invention is devised by considering such a problem and it is an object of the present invention to provide an attraction force cancel type linear motor in which armature modules are respectively positioned and fixed and a space factor of windings can be increased to its limit without sacrificing spaces for arranging the windings, and accordingly, the efficiency of the linear motor is improved.

Means for Solving the Problems

For solving the above-described problems, there is provided a linear motor including: a mover part including; an armature module having an I shaped magnetic iron core and an armature winding of one kind wound on the periphery of the I shaped magnetic iron core through an insulating material, a non-magnetic material holder on which a plurality of armature modules are arranged in a stroke direction, and a base upper plate and a base lower plate for attaching the non-magnetic material holder in upper and lower parts respectively, and a stator part including; a plurality of field permanent magnets opposed to the I shaped magnetic iron cores through magnetic spaces and field yokes for supporting the field permanent magnets, wherein the non-magnetic material holder has at both end parts thereof through holes corresponding to the forms and the arranging pitches of the I shaped magnetic iron cores, and bolts are inserted into the through holes to fix the non-magnetic material holder to the base upper plate and the base lower plate.

Specifically, there is provided a linear motor comprising: a mover part including; an armature module having an I shaped magnetic iron core and an armature winding of one kind wound on the periphery of the I shaped magnetic iron core through an insulating material, and a base upper plate and a base lower plate to which a plurality of armature modules are respectively attached in upper and lower parts thereof, and a stator part including; a plurality of field permanent magnets opposed to the I shaped magnetic iron cores through magnetic spaces and field yokes for supporting the field permanent magnets, wherein in both the end parts of the base upper plate and the base lower plate and the I shaped magnetic iron cores, pin holes corresponding to the forms and the arranging pitches of the I shaped magnetic iron cores are formed, and pins are inserted into the pin holes to fix the I shaped magnetic iron cores between the base upper plate and the base lower plate.

More specifically, the pin hole is a hole penetrating the I shaped magnetic iron core, and the pin is a long penetrating pin.

More specifically, the present invention further includes sub-teeth for canceling a clogging due to an end effect generated in both ends of the armatures provided in front and rear ends in the stroke direction of a group of the armature modules, wherein pin holes are formed on both the end parts of the base upper plate and the base lower plate and the sub-teeth, and pins are inserted into the pin holes to fix the sub-teeth between the base upper plate and the base lower plate.

More specifically, a gap part of the armature winding is filled with a mold resin.

More specifically, the present invention further include a same stator part provided at a symmetrical position to the stator part with respect to the mover part in an opposite side to the stator part by sandwiching the mover part in therebetween.

More Specifically, a guide part of a linear guide is fixed to the lower side of the base lower plate.

ADVANTAGE OF THE INVENTION

According to the above-described structure, since a winding space is not sacrificed, the space factor of a winding can be increased to its limit and a highly efficient linear motor can be realized.

BRIEF DESCRIPTION OF THE DRAWINGS

FIG. 1 is a magnetic attraction force cancel type linear motor according to a first embodiment of the present invention.

FIG. 3 is a magnetic attraction force cancel type linear motor according to a second embodiment of the present invention.

FIG. 4 is a magnetic attraction force cancel type linear motor according to a third embodiment of the present invention.

DESCRIPTION OF REFERENCE NUMERALS AND SIGNS

1 I shaped magnetic iron core
1a, 1a' pin hole
2 armature winding
3 insulating resin
4 non-magnetic holder
41 through hole
5 bolt
6 motor terminal part
7 motor lead
8 base plate
8a base upper plate
8b base lower plate
9 field yoke
10 field permanent magnet
11 mold resin
21 pin
21' long penetrating pin
31 linear guide block
32 linear guide rail
51 sub-teeth

BEST MODE FOR CARRYING OUT THE INVENTION

Now, embodiments of the present invention will be described below by referring to the drawings.

First Embodiment

Figure 1A:
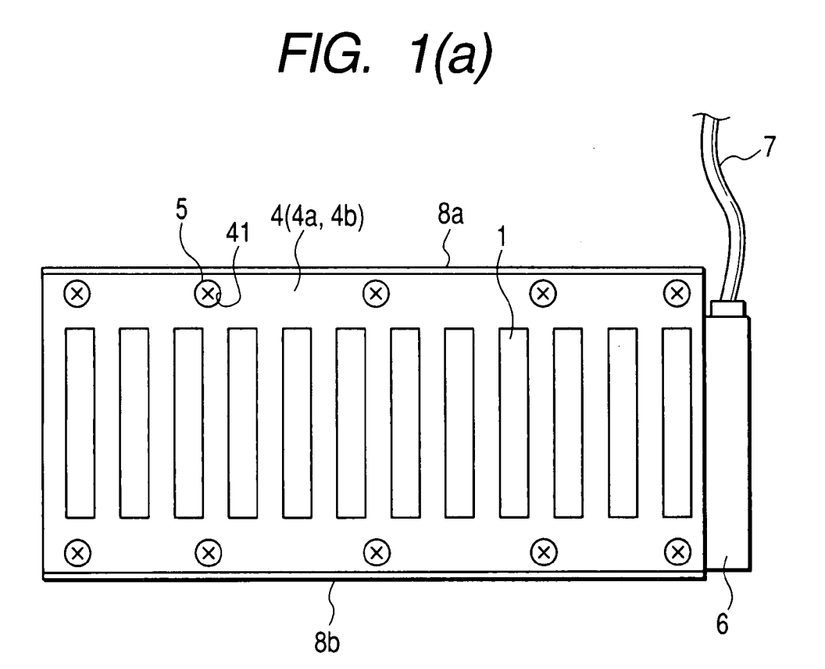
FIG. 1(a) is a front view and FIG. 1(b) is a side sectional view.
Figure 1B:
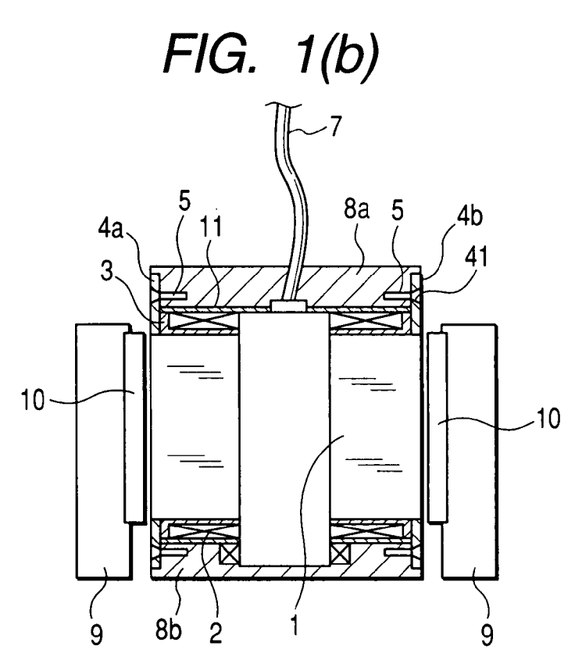

FIG. 1 shows a first embodiment of a magnetic attraction force cancel type linear motor according to the present invention, FIG. 1(a) is a front view and FIG. 1(b) is a side sectional view.

In the drawing, 1 designates an I shaped magnetic iron core, 2 designates an armature winding, 3 designates an insulating resin, 4 designates a non-magnetic holder, 5 designates a bolt, 6 designates a motor terminal part, 7 designates a motor lead, 8 designates a base plate, 8a designates a base upper plate, 8b designates a base lower plate, 9 designates a field yoke and 10 designates a field permanent magnet.

As apparent from the drawing, the insulating resin 3 is molded in the I shaped magnetic iron core 1 with a small thickness to ensure an electric insulating layer, and the armature winding 2 is wound thereon to form an armature module. A plurality of the armature modules are attached to the non-magnetic holder 4 (a left side non-magnetic holder is designated by 4a and a right side non-magnetic holder is designated by 4b) in a stroke direction. Further, the upper and lower parts of the non-magnetic holder 4 are respectively attached to the base upper plate 8a and the base lower plate 8b.

In that case, the through holes 41 corresponding to the forms and the arranging pitches of the I shaped magnetic iron core are formed at both end parts of the non-magnetic holder 4 and the bolts 5 are inserted into the through holes 41 to fix the non-magnetic holder 4 to the base upper plate 8a and the base lower plate 8b.

Further, a space part is filled with the mold resin 11 to obtain the mechanical strength of an armature part.

Further, as shown in the drawing, in both the sides of the armature winding 2, field parts are formed through gap parts by fixing the field permanent magnets 10 to the filed yokes 9.

Figure 2:
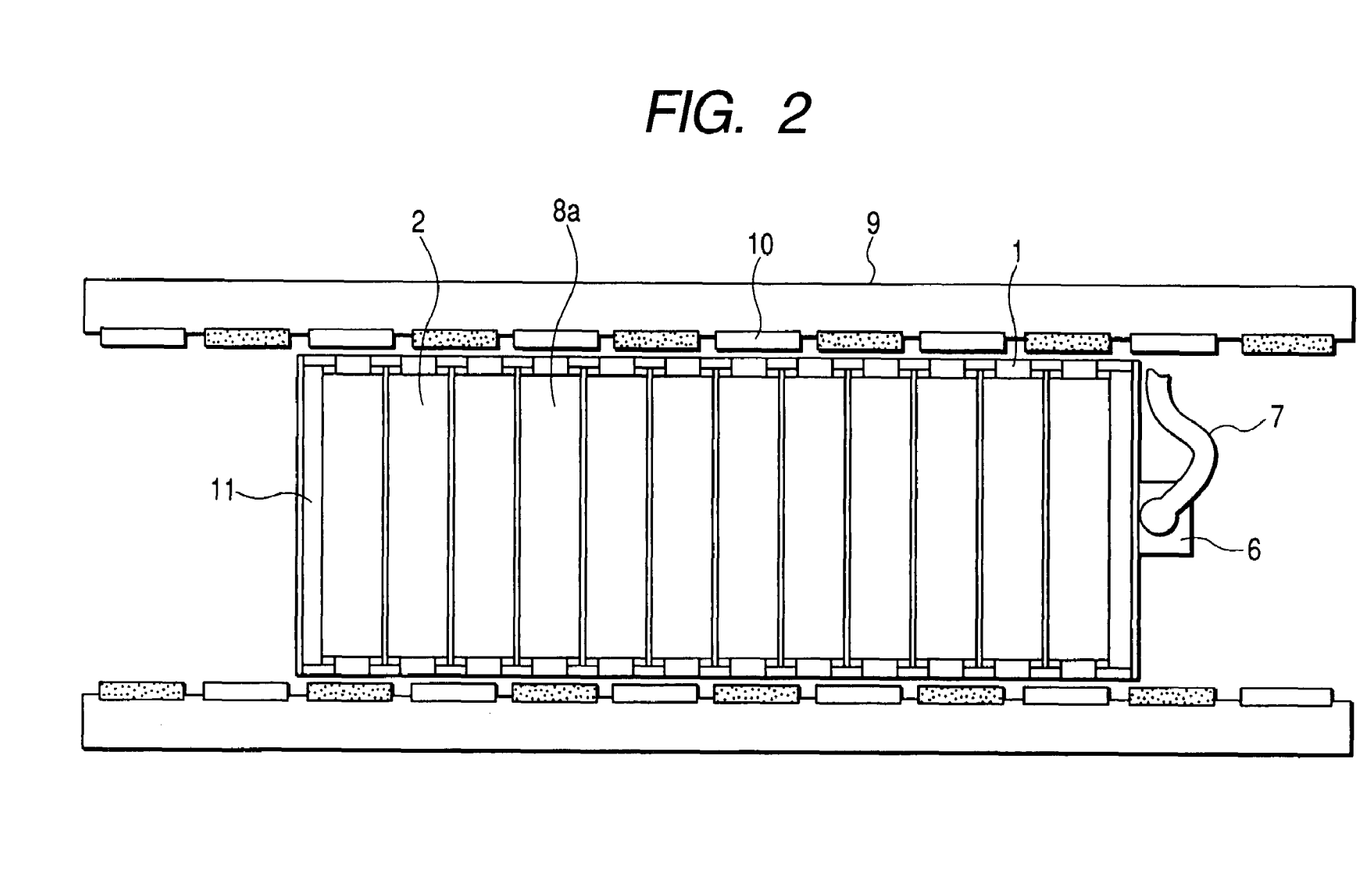
FIG. 2 is a plan view of the magnetic attraction force cancel type linear motor according to the first embodiment of the present invention.

FIG. 2 is a plan view of the attraction force cancel type linear motor of FIG. 1.

As apparent from FIG. 2, many field permanent magnets 10 are arranged inside the two field yokes 9 extending in parallel with each other so that adjacent polarities are made to be different from one another. Inside the two field yokes 9, movers are arranged with spaces between the field permanent magnets 10 and the movers.

The difference between the first embodiment of the present invention and the linear motor described in the Patent Document 1 resides in that in the first embodiment, since the armature module is fixed (by the bolt) at the end part of the I shaped magnetic iron core 1, the armature module can be fixed without sacrificing a winding space.

Accordingly, the space factor of the winding can be increased to its limit and a highly efficient linear motor can be obtained.

Second Embodiment

Figure 3A:
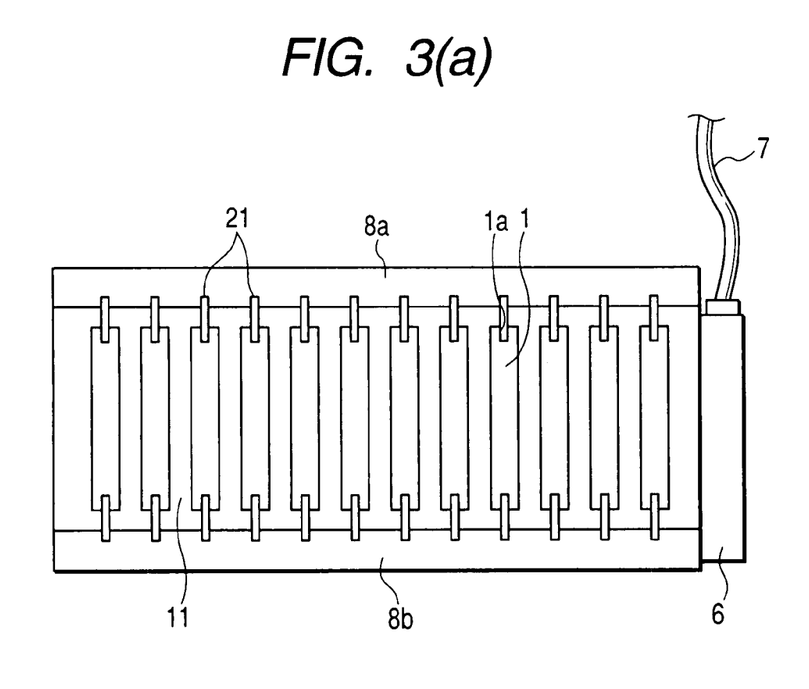
FIG. 3(a) is a front view and FIG. 3(b) is a side sectional view.
Figure 3B:
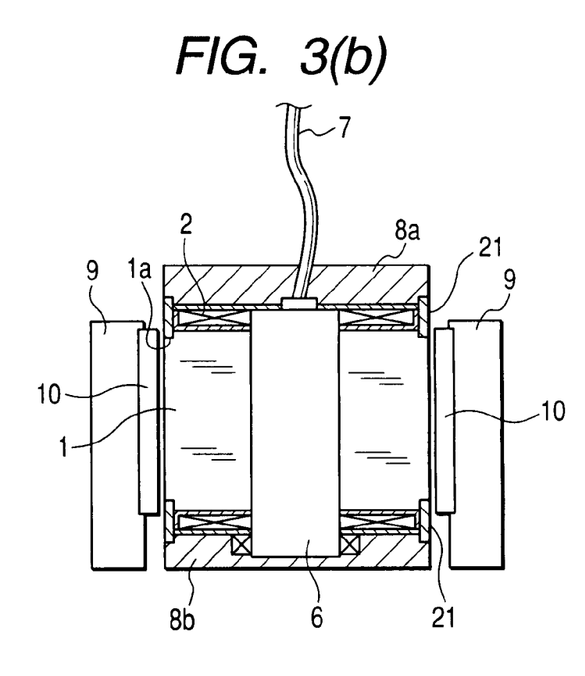

FIG. 3 is an attraction force cancel type linear motor according to a second embodiment, FIG. 3(a) is a front view and FIG. 3(b) is a side view. In FIG. 3, since the same reference numerals represent the same members as those of FIGS. 1 and 2, a duplicated explanation will be omitted. 11 designates a mold resin and 21 designates a pin.

In a second embodiment, an armature winding 2 of one kind is wound on the periphery of an I shaped magnetic iron core 1 the same as that of the first embodiment through an insulating material to form an armature module. A plurality of the armature modules are arranged in a stroke direction and respectively attached to a base upper plate 8a and a base lower plate 8b by pins in their upper and lower parts. Pin holes are provided correspondingly to the forms and arranging pitches of the I shaped magnetic iron cores.

As described above, in the first embodiment shown in FIGS. 1 and 2, the armature modules are positioned and fixed by the non-magnetic holder 4. However, the second embodiment is different from the first embodiment in a point that the armature modules are positioned and fixed by the pins 21. In such a way, two non-magnetic holders (4a, 4b in FIG. (1b)) are not necessary so that the number of parts and a cost can be reduced.

Third Embodiment

Figure 4A:
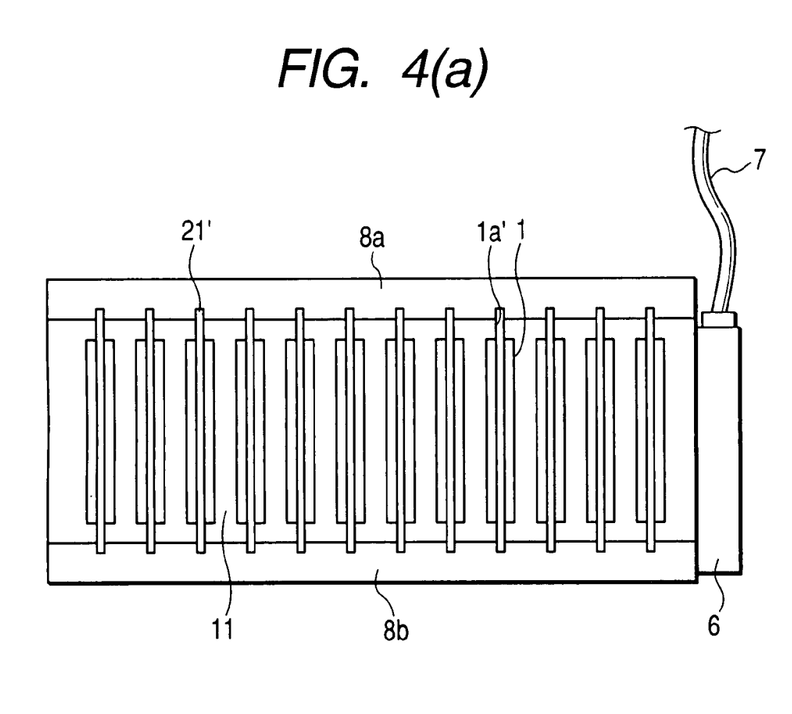
FIG. 4(a) is a front view and FIG. 4(b) is a side sectional view.
Figure 4B:
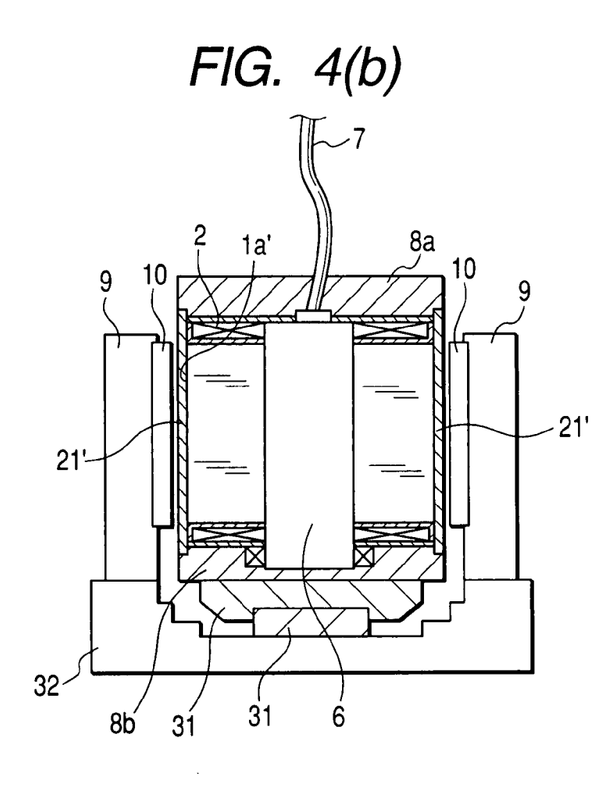

FIG. 4 is an attraction force cancel type linear motor according to a third embodiment, FIG. 4(a) is a front view and FIG. 4(b) is a side view. In FIG. 4, since the same reference numerals represent the same members as those of FIG. 3, a duplicated explanation will be omitted. 21' designates a penetrating pin.

In a thirds embodiment, an armature winding 2 of one kind is wound on the periphery of an I shaped magnetic iron core 1 the same as that of the first embodiment through an insulating material to form an armature module. A plurality of the armature modules are arranged in a stroke direction. Through holes are formed that pass through from the upper parts to the lower parts of the armature modules and the armature modules are attached to a base upper plate 8a and a base lower plate 8b by long penetrating pins 21' extending from the base upper plate 8a to the base lower plate 8b. Pin holes 1a' are provided correspondingly to the forms and the arranging pitches of the I shaped magnetic iron cores.

Further, a linear guide block 31 is fixed to the lower surface of the base lower plate 8b, though this may be realized in any of the structures of the first embodiment and the second embodiment. The linear guide block 31 is combined with a linear guide rail 32 fixed to a mechanism part and accordingly supported so as to freely slide.

As described above, in the third embodiment, since the long penetrating pins 21' are used, the I shaped magnetic iron cores 1 are positioned and fixed to the base upper plate 8a and the base lower plate 8b more strongly than a fixation by the pins in the second embodiment.

Fourth Embodiment

Figure 5:
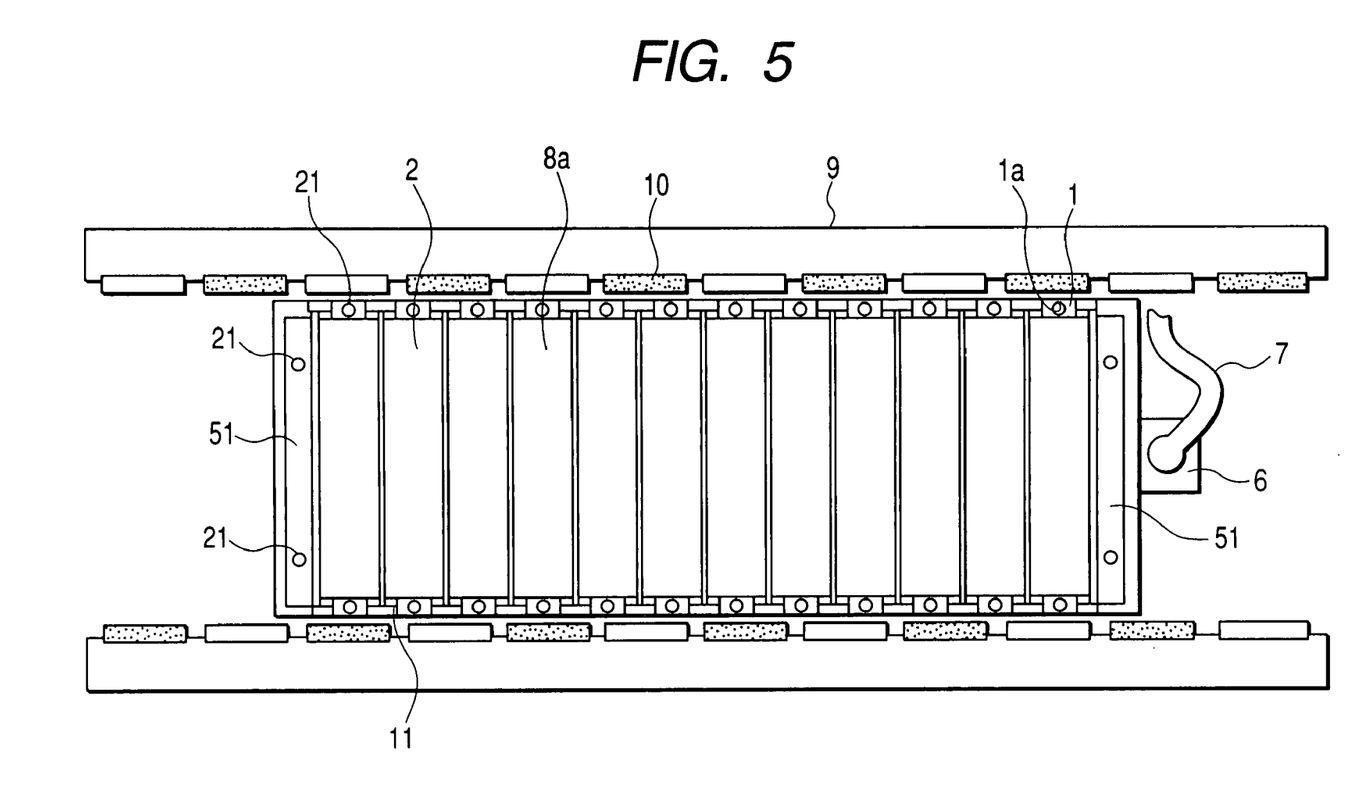
FIG. 5 is a plan view of a magnetic attraction force cancel type linear motor according to a fourth embodiment of the present invention.

FIG. 5 is a plan view of an attraction force cancel type linear motor according to a fourth embodiment.

In the drawing, 51 designates sub-teeth for canceling a clogging due to an end effect in the front and rear end parts of an armature. The sub-teeth has a dimension in the direction of width (advancing direction) is half as shot as that of other ordinary I shaped magnetic iron cores (teeth). When such a sub-teeth 51 is attached to a base upper plate 8a and a base lower plate 8b (not seen in the drawing), pins 21 or penetrating pins 21' are used in the same manner as that of the second embodiment and the third embodiment. Thus, a space for winding an armature winding is increased so that a motor efficiency can be improved, the number of parts can be reduced and the parts can be assuredly attached.

As described above, according to the present invention, since the end parts of the I shaped magnetic iron core 1 are fixed by the base upper plate and the lower base plate, the armature winding can be wound all space on which the winding can be wound, the loss of the motor can be reduced and a motor efficiency can be improved. Thus, a driving duty can be enhanced and a tact time can be shortened, so that the present invention may be applied to a use such as an electronic parts mounting machine.

In all the above-described embodiments, the attraction force cancel type linear motor having the two stator parts provided at symmetrical positions with respect to the mover part is described as an example, however, the present invention is not limited thereto.

A linear motor having even one stator part with respect to a mover part can be moved. Accordingly, in that case, to the linear motor using an I shaped magnetic iron core, the present invention may be applied. Therefore, it is to be understood that the end parts of the I shaped magnetic iron core are fixed by a base upper plate and a base lower plate so that an armature winding can be wound on all spaces to be wound by the armature winding to reduce the loss of a motor and improve a motor efficiency.

INDUSTRIAL APPLICABILITY

As described above, since the present invention can realize a highly efficient linear motor, the present invention is available for a direct driven stage device requiring an accurate positioning and various kinds of semiconductor producing devices that require such a direct driven stage device.

The invention claimed is:

1. A linear motor comprising:
   a mover part including; an armature module having an I shaped magnetic iron core and an armature winding of one kind wound on the periphery of the I shaped magnetic iron core through an insulating material, a non-magnetic material holder on which a plurality of armature modules are arranged in a stroke direction, and a base upper plate and a base lower plate for attaching the non-magnetic material holder in upper and lower parts respectively, and
   a stator part including; a plurality of field permanent magnets opposed to the I shaped magnetic iron cores through magnetic spaces and field yokes for supporting the field permanent magnets, wherein
   the non-magnetic material holder has at both end parts thereof through holes corresponding to the forms and the arranging pitches of the I shaped magnetic iron cores, and bolts are inserted into the through holes to fix the non-magnetic material holder to the base upper plate and the base lower plate.

2. The linear motor according to claim 1, wherein a gap part of the armature winding is filled with a mold resin.

3. The linear motor according to claim 1, further comprising:
   two stator parts provided at a symmetrical position to the stator part with respect to the mover part in an opposite side to the stator part by sandwiching the mover part in therebetween.

4. The linear motor according to claim 1, wherein a guide part of a linear guide is fixed to the lower side of the base lower plate.

5. A linear motor comprising:
   a mover part including; an armature module having an I shaped magnetic iron core and an armature winding of one kind wound on the periphery of the I shaped magnetic iron core through an insulating material, and a base upper plate and a base lower plate to which a plurality of armature modules are respectively attached in upper and lower parts thereof, and
   a stator part including; a plurality of field permanent magnets opposed to the I shaped magnetic iron cores through magnetic spaces and field yokes for supporting the field permanent magnets, wherein in both the end parts of the base upper plate and the base lower plate and the I shaped magnetic iron cores, pin holes corresponding to the forms and the arranging pitches of the I shaped magnetic iron cores are formed, and pins are inserted into the pin holes to fix the I shaped magnetic iron cores between the base upper plate and the base lower plate.

6. The linear motor according to claim 5, wherein the pin hole is a hole penetrating the I shaped magnetic iron core, and the pin is a long penetrating pin.

7. The linear motor according to claim 5, further comprising:

sub-teeth for canceling a cogging due to an end effect generated in both ends of the armatures provided in front and rear ends in the stroke direction of a group of the armature modules, wherein pin holes are formed on both the end parts of the base upper plate and the base lower plate and the sub-teeth, and pins are inserted into the pin holes to fix the sub-teeth between the base upper plate and the base lower plate.

8. The linear motor according to claim 5, wherein a gap part of the armature winding is filled with a mold resin.

9. The linear motor according to claim 5, further comprising:

two stator parts provided at a symmetrical position to the stator part with respect to the mover part in an opposite side to the stator part by sandwiching the mover part in therebetween.

10. The linear motor according to claim 5, wherein a guide part of a linear guide is fixed to the lower side of the base lower plate.

* * * * *